Figures 3, 4:
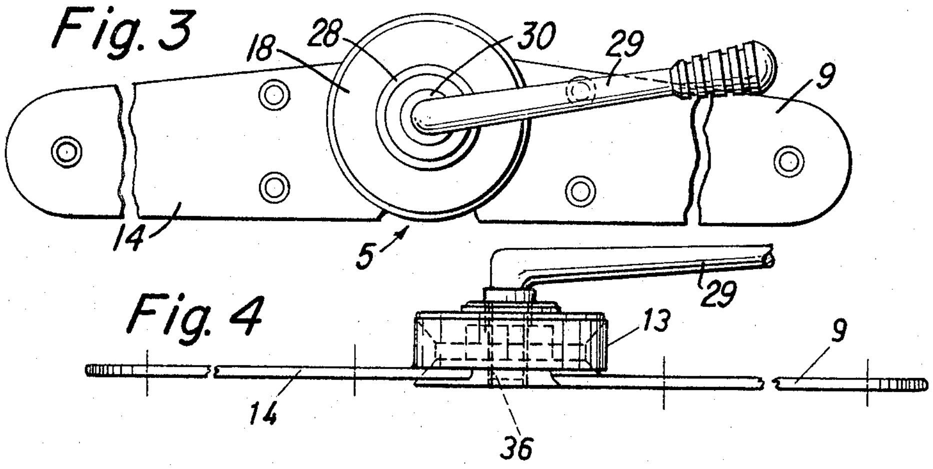

BY
[signature]
ATT'Y

Sept. 13, 1966  S. A. R. FLODELL  3,271,811
HINGE CONNECTION BETWEEN THE BACK AND THE SEAT OF A CHAIR
AND SIMILAR ARTICLES OF FURNITURE
Filed Jan. 30, 1964  3 Sheets-Sheet 1

Sept. 13, 1966 S. A. R. FLODELL 3,271,811

HINGE CONNECTION BETWEEN THE BACK AND THE SEAT OF A CHAIR AND SIMILAR ARTICLES OF FURNITURE

Filed Jan. 30, 1964 3 Sheets-Sheet 2

BY

Att'y

BY [signature]
ATT'Y

Sept. 13, 1966  S. A. R. FLODELL  3,271,811
HINGE CONNECTION BETWEEN THE BACK AND THE SEAT OF A CHAIR
AND SIMILAR ARTICLES OF FURNITURE
Filed Jan. 30, 1964  3 Sheets-Sheet 3

BY
ATT'Y

United States Patent Office 3,271,811

Patented Sept. 13, 1966

3,271,811

HINGE CONNECTION BETWEEN THE BACK AND THE SEAT OF A CHAIR AND SIMILAR ARTICLES OF FURNITURE

Stig Axel Rune Flodell, Vastra Frolunda, Sweden, assignor to Karl Anders Davidson, Orkelljunga, Sweden Filed Jan. 30, 1964, Ser. No. 341,261
Claims priority, application Sweden, Feb. 5, 1963, 1,226/63; Jan. 23, 1964, 818/64
7 Claims. (Cl. 16—140)

This invention has reference to a hinge connection between the back and the seat of a chair, especially the front seat of a car. The hinge connection has a preferably a hinge on either side of the front seat and comprises a support having an arm connected to the seat and a bearing housing which is turnable relatively to said support, said housing having an arm connected to the back or vice versa.

The main feature of the invention is to be seen therein that the bearing housing is provided with two conical surfaces turned from each other, the support resting against one of these surfaces with a corresponding conical surface and that a bearing washer with an outer conical mantle surface rests against the other conical surface of the bearing housing, said washer having a central port with a non-circular cross section fitting a central stud on said bearing portion having an arm, said hinge connection also comprising a lever adapted for pressing said bearing washer with its mantle surface against one mantle surface of the bearing housing simultaneously as the other mantle surface of the same is pressed against the mantle surface of the support. Such a hinge device makes it possible to variably change the inclining position of the back in relation to the seat. The locking of the back in adjusted inclining position can be performed easily and comfortably. Another advantage in such a hinge device operating with friction engagement in connection with the front seat of a car is to be seen therein that the person occupying the seat while overcoming the friction engagement at an overloading, e.g. a collison, slowly is folded rearwards. This folding rearwards under friction resistance reduces highly the collision stresses on the person in question.

According to another preferred embodiment of the invention, around a stud of the support extending into the bearing housing there is wound and attached with one end a helical spring which with the other end is attached to the mantle wall of the bearing housing. Due to this spring the back is folded—after the loosening of the friction engagement by means of the lever—automatically frontwards until it abuts against the back of the person seated on the seat and is allowed to remain in the intended inclining position before the hinge connection again is clamped by means of the lever.

Due to the fact that the back of the front seats are foldable rearwards to horizontal position the car seats are easily converted to beds.

In two-doors coupés it is as known necessary to fold the backs of the front seats forwards to make it possible for a person to enter the rear seat. It should then be inconvenient if the friction engagement had to be disengaged every time the back is to be folded forwards. This problem is according to this invention solved in such a way that the back can be folded from a position inclining rearwards and adjusted by means of the lever forwards in such a way that a person comfortably can pass behind the back of the seat. After the folding rearwards of the back to the initial position it is possible in the way described in the aforegoing again variably to change the inclining of the back as desired. This is according to a further embodiment of the invention obtained thereby that the arm connected to the back is journalled on the stationary bearing portion, the support, connected to the seat and in that the bearing housing is provided with a stop means situated in the movement path of a portion of the back, said stop means adapted, at the abutment of said portion at the folding rearwards of the back after the disconnection of the hinge device by means of the lever against the action of the spring, to turn said bearing housing and thereby to render possible an adjusted inclining position of the back.

According to a further development of the invention the screw, extending completely through the hinge connection, is at the end opposite the lever, said end being threaded, adapted to be screwed into a nut, the latter adapted only after an axial projection into the bearing portion connected to the seat to render possible a turning in relation to this portion a part of a revolution about the screw and then to be kept in adjusted turned position. Due to this device there can easily be performed such an arrangement that the lever at the mounting of the hinge connection will be given such a direction that it will be easy to reach with the hand for operation.

Figures 1, 2, 5:
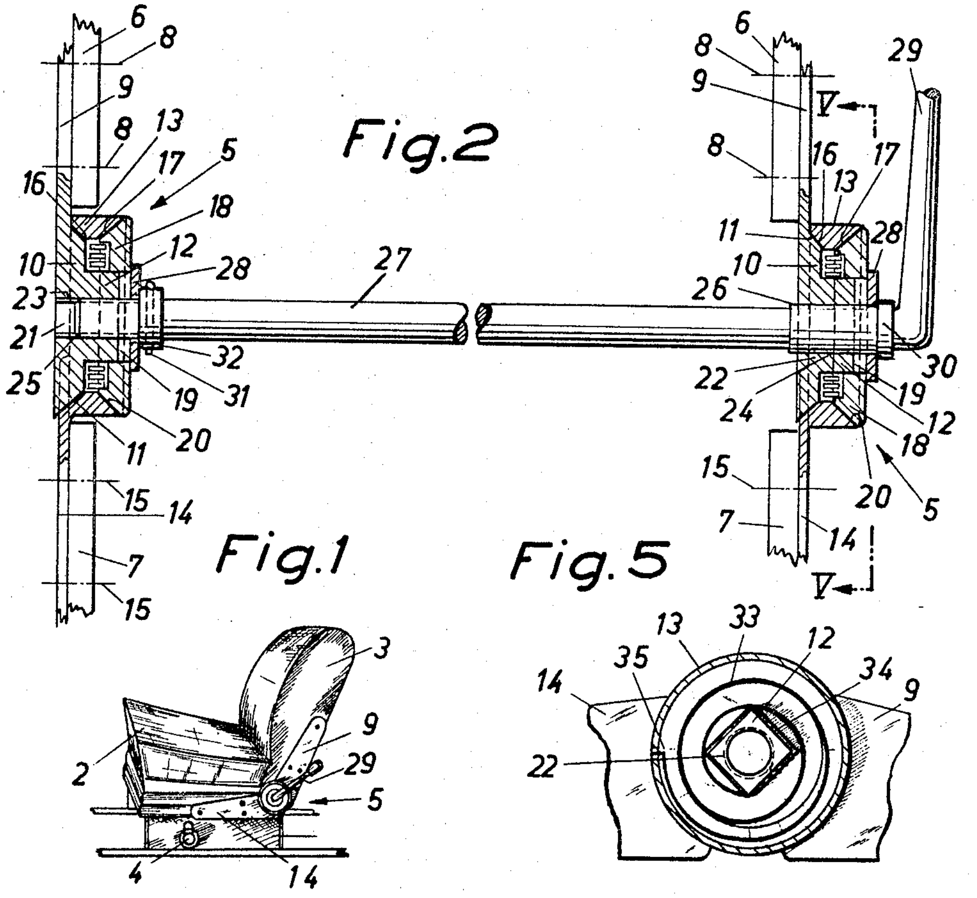
Figures 6, 9:
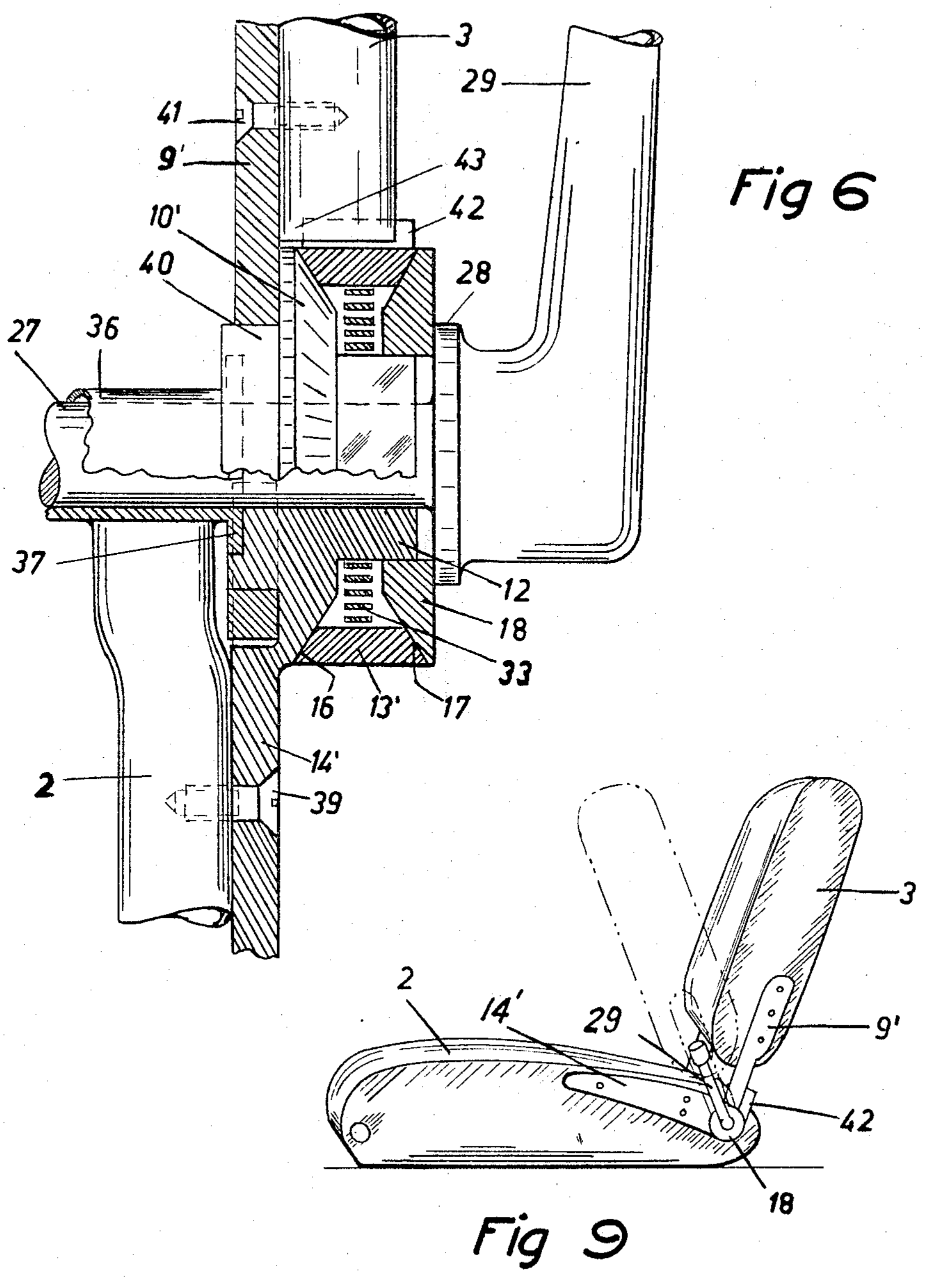
Figures 7, 8:
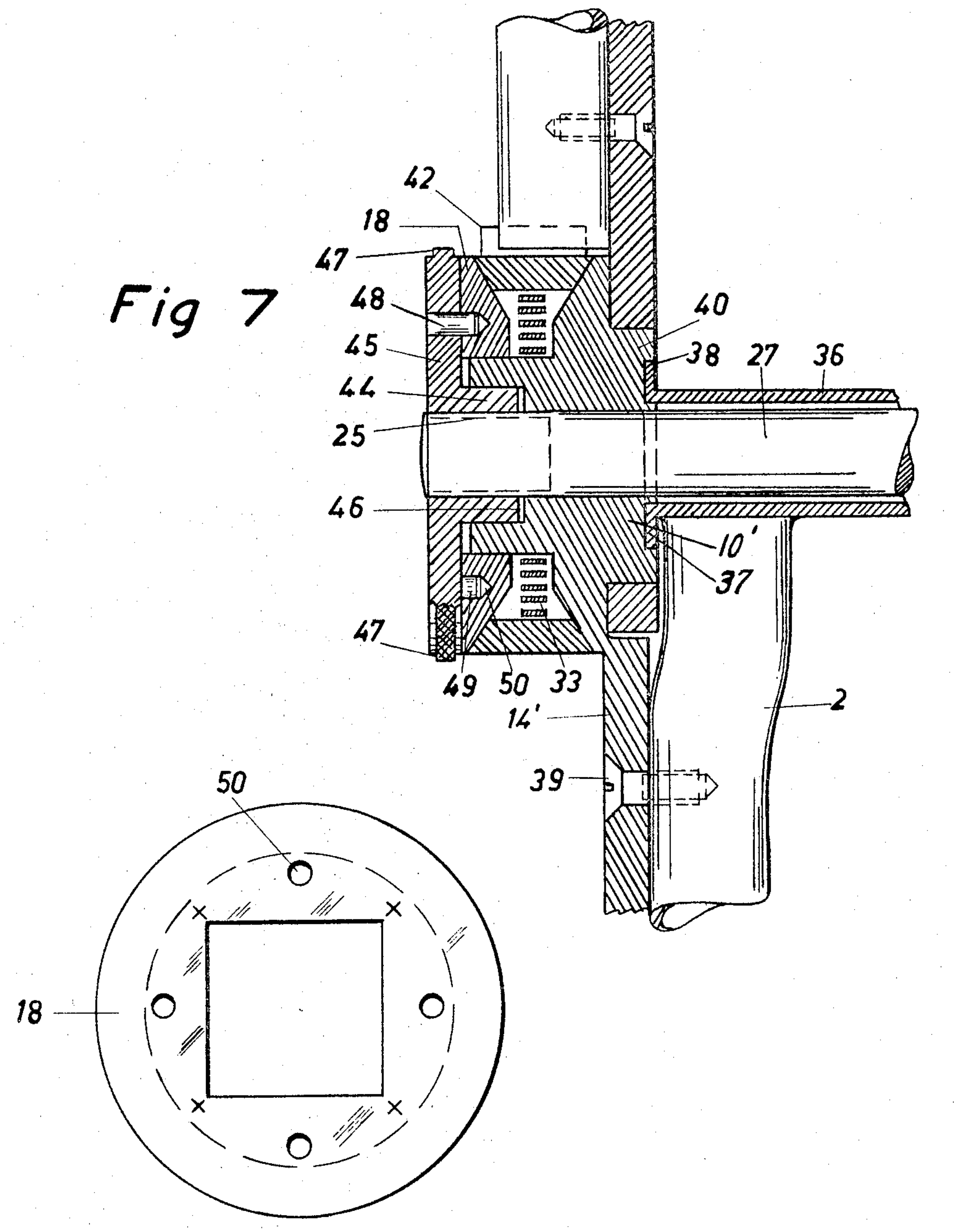

In the following the invention will be elucidated with reference to the accompanying drawings. In the drawings:

FIG. 1 is a side elevation of one side of the front seat of a car,

FIG. 2 shows on an enlarged scale an axial section through the hinge connections on both sides of the chair, FIG. 3 is a partly cut side elevation of one of the hinge connections, FIG. 4 is a plan view of a hinge connection according to another embodiment, FIG. 5 shows a cross section through the hinge connection on the line V—V in FIG. 2, FIG. 6 shows on an enlarged scale a longitudinal section through the, according to the drawings, right hand portion of the hinge connection according to another embodiment of the hinge for the left hand front seat of a car, FIG. 7 shows a similar section through the, according to the drawings, left hand portion of the hinge connection, FIG. 8 is an end elevation of the bearing washer shown in FIG. 7, and FIG. 9 shows on a reduced scale a side elevation of the left hand front seat provided with a device according to FIGS. 5–7 inclusive.

The invention is in first hand adapted to be used for that kind of chairs which is shown in FIG. 1, i.e. the front seat of a car. The frame 1 of the front seat carries a seat 2 and a back 3 which as a unit are movable on a guide (not shown) and lockable in different positions by means of a lever 4. The back 3 is by means of a hinge connection 5 according to the invention journalled on the rear border of the seat 2.

According to the embodiment shown in FIG. 2 the back—only a part of its body 6 shown in this figure—is journalled to the seat—only a portion of its body 7 shown in this figure—by means of two coaxial hinge connections 5 according to the invention, arranged on both sides of the chair. Each hinge connection 5 comprises an arm 9 attached to the body 7 by means of screws 8, said arm 9 at one end shaped with a bearing support 10 with a conical mantle surface 11. The support 10 is provided with an axial, square stud 12 extending axially into a bearing housing 13 on one end of an arm 14 which by means of screws is attached to the seat body 7. The bearing housing 13 is provided with mantle surfaces 16, 17 diverging outwards, one of said surfaces fitting to the conical mantle surface 17 on the bearing housing 13. Each bearing support 10 is provided with an axial bore 21, 22 which is provided with inner threads 23, 24 fitting outer threads 25, 26 of a shaft 27 common for both the hinge connections. The shaft 27 extends through two washers 28 extending over the border on the opening 19 in the washer 18 in question. On one end the shaft 27 is provided with a lever 29 and at the base of this lever there is a flange 30 situated on the outside of the washer 28 of the adjacent hinge connection. Outside the washer 28 of the other hinge connection 5 the shaft 27 is provided with a sleeve 32 attached to the shaft by means of a pin 31.

The shaft 27 is supposed to be shaped with right-handed threads 25, 26. When the shaft 27 with the lever 29 is turned in clockwise direction, the bearing washers 18 are clamped against the bearing housing in question in such a way that the friction surfaces 11, 16 and 17, 20 are brought to friction engagement with each other. The back 3 is then retained in the adjusted inclining position.

So as to avoid the necessity of using a hand for bringing the back 3 to correct inclined position—after the loosening of the hinge connections 5 by turning the shaft 27 with the lever 29 in counterclockwise direction—the hinge connections are both provided with a helical spring 33 which with the inner end 34 is shaped to fit the stud 12 and is put on the latter, said spring 33 with the outer end 35 attached to the bearing housing 13 and being stretched in such a way that it has a tendency to tilt the back 3 forwards. When the hinge connections 5 are freed by means of the lever 29, i.e. the friction engagement between the conical surfaces 11, 16 and 17, 20 ceases, the back 3 is by the springs 33 tilted forwards against the back of the person on the seat 2, and this person can then by taking up a certain position, inclining forwards or rearwards, adjust the back in a suitable inclining position. The hinge connections 5 are then again locked by means of the lever 29.

The hinge connection shown in FIG. 4 is supposed to be used only at one side of the chair while at the opposite side of the chair there is used a hinge of conventional construction. The shaft 27 has in this case been replaced with a threaded pin 36 on the inner end of the lever 29. For the rest this hinge connection corresponds entirely to the hinge connection 5 shown to the right in FIG. 2.

According to the embodiment shown in FIGS. 6–9, the seat 2 is shaped with a tube body and provided with a transverse tube 36, the latter at the ends provided with a flange 37. The flange 37 engages a corresponding notch 38 in the stationary bearing support 10′. The latter is provided with an arm 14′ which by means of screws 39 or the like is attached to the seat 2. The bearing support 10′ is also provided with an axial bearing stud 40 about which is journalled one end of the arm 9 which by means of screws 41 or the like is attached to the back 3. The bearing housing 13′ is shaped as a ring with conical surfaces 16, 17 turned from each other and has externally a strong stop abutment 42 serving as a stopper for the lower end 43 of the body of the back shaped as a tube loop or a tube frame. The spring 33 is arranged between the square stud 12 on the bearing support 10′ and the bearing housing 13′ in such a way that it will tend to turn the bearing housing 13′ in such a direction that the abutment 42 is pressed against the rear side of the back 3.

When the screw 27 with the lever 29 is tightened and the washer 28 presses the bearing washer 18 against the bearing housing 13′ and the latter in turn presses against the bearing support 10′, the bearing housing is locked in such a way that it cannot thereupon be turned. The abutment 42 then prevents the back 3 from being folded rearward. However, it can when desired be folded for forward as the arm 9′ is journalled on the bearing stud 40. Upon folding the back rearwards to the initial position it is, upon loosening of the shaft or screw 27 by means of the lever 29, possible to fold the back 3, e.g. rearwards by pressing it with the back, and hereby the bearing housing 13′ is, because the end 43 presses against the abutment 42, swung against the action of the spring 33 until the desired inclination position has been reached whereupon the screw 27 again is tightened by means of the lever 29.

The end of the screw 27 situated opposite the lever 29 (FIG. 7) is provided with threads 25 fitting internal threads on the hub 44 of a nut 45. The hub 44 is axially insertable into a central bore 46 in the bearing support 10′ situated on this side of the seat. For facilitating its turning the nut 45 is at its periphery provided with a milled surface 47 and it is further provided with a pin 48 which is adapted with its inner end 49 to be brought to engage a hole 50 in a row of holes in the outside of the bearing washer 18. The holes 50 in this row of holes are situated equidistantly along the arch of a circle with the screws 27 as the centre.

If at the mounting of the hinge connection the lever 29 in tightened position should be situated in such a way, e.g. obliquely rearwards, that it is not easily reached by the hand, one only has to loosen the screw 27 a certain number of revolutions and thereupon to move it axially together with the nut 45 to the left according to FIG. 7 in such a way that the end 49 of the pin 48 leaves the hole 50. The nut 45 is then turned a part of a revolution in such a way that the pin will be situated in front of another hole 50 in the row of holes, whereupon the whole unit is moved to the right and the screw 27 again is tigthened by means of the lever 29. By means of this simple adjustment it is possible to make such an arrangement that the lever in locked position always extends in such a direction that it is easily reached by the hand.

The shown and described embodiments are to be regarded only as examples and the different parts of the hinge connections 5 can be constructively modified in many ways within the scope of the appended claims. Each bearing washer 18 can be shaped in an integral unit with its washer 28. The bearing support 10 can be arranged on the arm 14 and the bearing portion 13 could instead be arranged on the arm 9. The stop abutment 42 could be replaced by other stop means. The pins 48 can be replaced by abutments on the inside of the nut 45. The pin and the abutment could be arranged on the outside of the bearing washer 18 and the row of holes instead be arranged on the inside of the nut 45.

What I claim is:

1. In a hinge connection between the back portion and the seat portion of a chair or a similar article of furniture, in particular the front seat of a car, bearing supports each having a conical surface and an arm connected to said seat portion, a bearing housing rotational in relation to said bearing support and having an arm connected to said back portion of said article of furniture, and a bearing washer with a conical surface, said bearing housing further provided with two conical surfaces turned from each other, said bearing support having its conical surface resting against one of said conical surfaces of said bearing housing, the other conical surface of said bearing housing resting against the conical surface of the bearing washer, said bearing washer having a central aperture with a non-circular cross section fitting a central stud shaped in a corresponding way on said bearing support, said hinge connection further comprising a lever on a screw capable of pressing said bearing washer, said bearing housing and said bearing support axially against each other with their conical surfaces contacting each other, a helical spring attached with one end to said stud, the other end of said spring attached to the said bearing housing, said spring adapted to fold said back portion in forward direction.

2. In a hinge connection between the back portion and the seat portion of a chair or a similar article of furniture, in particular the front seat of a car, bearing supports each having a conical surface and an arm connected to said seat portion, bearing housings on opposed sides of said article of furniture rotational in relation to said bearing supports and each having an arm connected to said back portion of said article of furniture, and bearing washers each provided with a conical surface, said bearing housings further provided with two conical surfaces turned from each other, each of said bearing supports having its conical surface resting against one of said conical surfaces of said bearing housings, the other conical surface of said bearing housing resting against the conical surface of a bearing washer, said bearing washers having a central aperture with a non-circular cross section fitting a central stud shaped in a corresponding way on said bearing support, said hinge connection further comprising a lever on a screw capable of pressing said bearing washers, said bearing housings and said bearing supports axially against each other with their conical surfaces contacting each other, said screw extending from the inner end of said lever and through a threaded axial bore in said studs of both of said bearing supports, said studs having non-circular cross sections, said screw adapted at its tightening to cause a pressing against each other of all the conical surfaces resting against each other.

3. In a hinge connection between the back portion and the seat portion of a chair or a similar article of furniture, in particular the front seat of a car, a bearing support having a conical surface and an arm connected to said seat portion, a bearing housing rotational in relation to said bearing support, and a bearing washer with a conical surface, said bearing housing further provided with two conical surfaces turned from each other, said bearing support having its conical surface resting against one of said conical surfaces of said bearing housing, the other conical surface of said bearing housing resting against the conical surface of the bearing washer, said bearing washer having a central aperture with a non-circular cross section fitting a central stud shaped in a corresponding way on said bearing support, said hinge connection further comprising a lever on a screw capable of pressing said bearing washer, said bearing housing and said bearing support axially against each other with their conical surfaces contacting each other, said arm connected with said back portion being journalled on said stationary bearing support connected to said seat portion, said bearing housing provided with a stop means situated in the movement path of any portion of said back portion, said stop means adapted, at the abutment against said back portion during the folding movement rearwards of said back portion after the disconnection of said hinge connection by means of said lever, to turn said bearing housing against the action of said spring so as to render possible an adjustment of the inclining position of said back portion.

4. In a hinge connection between the back portion and the seat portion of a chair or a similar article of furniture, in particular the front seat of a car, a bearing support having a conical surface and an arm connected to said seat portion, a bearing housing rotational in relation to said bearing support, and a bearing washer with a conical surface, said bearing housing further provided with two conical surfaces turned from each other, said bearing support having its conical surface resting against one of said conical surfaces of said bearing housing, the other conical surface of said bearing housing resting against the conical surface of the bearing washer, said bearing washer having a central aperture with a non-circular cross section fitting a central stud shaped in a corresponding way on said bearing support, said hinge connection further comprising a lever on a screw capable of pressing said bearing washer, said bearing housing and said bearing support axially against each other with their conical surfaces contacting each other, said arm connected with said back portion being journalled on said stationary bearing support connected to said seat portion, said bearing housing provided with a stop means situated in the movement path of any portion of said back portion, said stop means adapted, at the abutment against said back portion during the folding movement rearwards of said back portion after the disconnection of said hinge connection by means of said lever, to turn said bearing housing against the action of said spring so as to render possible an adjustment of the inclining position of said back portion, said arm connected to said back portion with one end journalled about an axial stud on said bearing support connected to said seat portion.

5. In a hinge connection between the back portion and the seat portion of a chair or a similar article of furniture, in particular the front seat of a car, a bearing support having a conical surface and an arm connected to said seat portion, a bearing housing rotational in relation to said bearing support, and a bearing washer with a conical surface, said bearing housing further provided with two conical surfaces turned from each other, said bearing support having its conical surface resting against one of said conical surfaces of said bearing housing, the other conical surface of said bearing housing resting against the conical surface of the bearing washer, said bearing washer having a central aperture with a non-circular cross section fitting a central stud shaped in a corresponding way on said bearing support, said hinge connection further comprising a lever on a screw capable of pressing said bearing washer, said bearing housing and said bearing support axially against each other with their conical surfaces contacting each other, said arm connected with said back portion being journalled on said stationary bearing support connected to said seat portion, said bearing housing provided with a stop means situated in the movement path of any portion of said back portion, said stop means adapted, at the abutment against said back portion during the folding movement rearwards of said back portion after the disconnection of said hinge connection by means of said lever, to turn said bearing housing against the action of said spring so as to render possible an adjustment of the inclining position of said back portion, said stop means comprising an abutment situated on the outside of said bearing housing.

6. In a hinge connection between the back portion and the seat portion of a chair or a similar article of furniture, in particular the front seat of a car, a bearing support having a conical surface and an arm connected to said seat portion, a bearing housing rotational in relation to said bearing support, and a bearing washer with a conical surface, said bearing housing further provided with two conical surfaces turned from each other, said bearing support having its conical surface resting against one of said conical surfaces of said bearing housing, the other conical surface of said bearing housing resting against the conical surface of the bearing washer, said bearing washer having a central aperture with a non-circular cross section fitting a central stud shaped in a corresponding way on said bearing support, said hinge connection further comprising a lever on a screw capable of pressing said bearing washer, said bearing housing and said bearing support axially against each other with their conical surfaces contacting each other, said arm connected with said back portion being journalled on said stationary bearing support connected to said seat portion, said bearing housing provided with a stop means situated in the movement path of any portion of said back portion, said stop means adapted, at the abutment against said back portion during the folding movement rearwards of said back portion after the disconnection of said hinge connection by means of said lever, to turn said bearing housing against the action of said spring so as to render possible an adjustment of the inclining position of said back portion, said screw extending through the whole hinge connection and having an end situated opposite said lever provided with threads and adapted to be screwed into an adjustable nut adapted to be adjusted, only after an axial displacement outwards from said bearing washer in said bearing support connected with said seat portion, by a turning of said nut a part of a revolution in relation to the portion of said bearing support in juxtaposition to said screw and said nut having means to normally keep it in adjusted position.

7. In a hinge connection between the back portion and the seat portion of a chair or a similar article of furniture, in particular the front seat of a car, a bearing support having a conical surface and an arm connected to said seat portion, a bearing housing rotational in relation to said bearing support, and a bearing washer with a conical surface, said bearing housing further provided with two conical surfaces turned from each other, said bearing support having its conical surface resting against one of said conical surfaces of said bearing housing, the other conical surface of said bearing housing resting against the conical surface of the bearing washer, said bearing washer having a central aperture with a non-circular cross section fitting a central stud shaped in a corresponding way on said bearing support, said hinge connection further comprising a lever on a screw capable of pressing said bearing washer, said bearing housing and said bearing support axially against each other with their conical surfaces contacting each other, said arm connected with said back portion being journalled on said stationary bearing support connected to said seat portion, said bearing housing provided with a stop means situated in the movement path of any portion of said back portion, said stop means adapted, at the abutment against said back portion during the folding movement rearwards of said back portion after the disconnection of said hinge connection by means of said lever, to turn said bearing housing against the action of said spring so as to render possible an adjustment of the inclining position of said back portion, said screw extending through the whole hinge connection at the end situated opposite said lever provided with threads and adapted to be screwed into an adjustable nut adapted to be adjusted, only after an axial displacement outwards from said bearing washer in said bearing support connected with said seat portion, by a turning of said nut a part of a revolution in relation to the portion of said bearing support in juxtaposition to said screw and said nut having means to normally keep it in adjusted position, said means comprising a pin extending parallel to the axis of rotation of said nut and adapted to be brought into engagement with any one of a series of holes arranged in a row along the arch of a circle on said portion of said bearing support.

References Cited by the Examiner

UNITED STATES PATENTS

| | | | |
|---|---|---|---|
| 612,135 | 10/1898 | Linn | 297—426 X |
| 1,151,637 | 8/1915 | Weis | 16—140 X |
| 1,182,125 | 5/1916 | Whitehead | 16—140 |
| 1,212,475 | 1/1917 | Gillies | 16—141 |
| 3,051,526 | 8/1962 | Werner et al. | 297—367 |
| 3,099,485 | 7/1963 | Beierbach et al. | 297—373 |

FOREIGN PATENTS

| | | |
|---|---|---|
| 60,800 | 5/1926 | Sweden. |

EDWARD C. ALLEN, *Primary Examiner.*

DONLEY J. STOCKING, *Examiner.*

D. GRIFFIN, *Assistant Examiner.*